United States Patent

[11] 3,545,354

| | | |
|---|---|---|
| [72] | Inventor | William J. McCune, Jr.<br>South Lincoln, Massachusetts |
| [21] | Appl. No. | 710,922 |
| [22] | Filed | March 6, 1968 |
| [45] | Patented | Dec. 8, 1970 |
| [73] | Assignee | Polaroid Corporation<br>Cambridge, Massachusetts<br>a corporation of Delaware |

[54] PHOTOGRAPHIC EXPOSURE CONTROL APPARATUS
9 Claims, 7 Drawing Figs.

[52] U.S. Cl. ............................................. 95/11, 240/1.3
[51] Int. Cl. ..................................................... G03b 15/035
[50] Field of Search............................................. 95/11, 11(lamps), 31, 10(C); 240/1.3, 37.1

[56] References Cited
UNITED STATES PATENTS

| | | | |
|---|---|---|---|
| 3,312,086 | 4/1967 | Casebeer................ | 240/1.3 |
| 3,326,103 | 6/1967 | Topaz.................... | 95/10(C) |
| 3,357,329 | 12/1967 | Nerwin................... | 95/11(Lamp) |
| 3,369,468 | 2/1968 | Sapp et al. ............ | 240/37.1 |

*Primary Examiner*—John M. Horan
*Assistant Examiner*—Alan Mathews
*Attorneys*—Brown and Mikulka, William D. Roberson and James L. Neal ABSTRACT: This disclosure involves photographic exposure control apparatus usable with a multilamp photoflash assembly. The apparatus is operable according to an ambient mode and a photoflash mode and is capable of sequentially advancing each of a plurality of lamps of the multilamp photoflash assembly to a position for ignition in timed relationship to sequential photographic exposures during operation according to the flash mode. When a first lamp is located for ignition, the apparatus is conditioned for operation according to the flash mode; and when the last lamp moves from the position for ignition, the apparatus is automatically conditioned for operation according to the ambient mode.

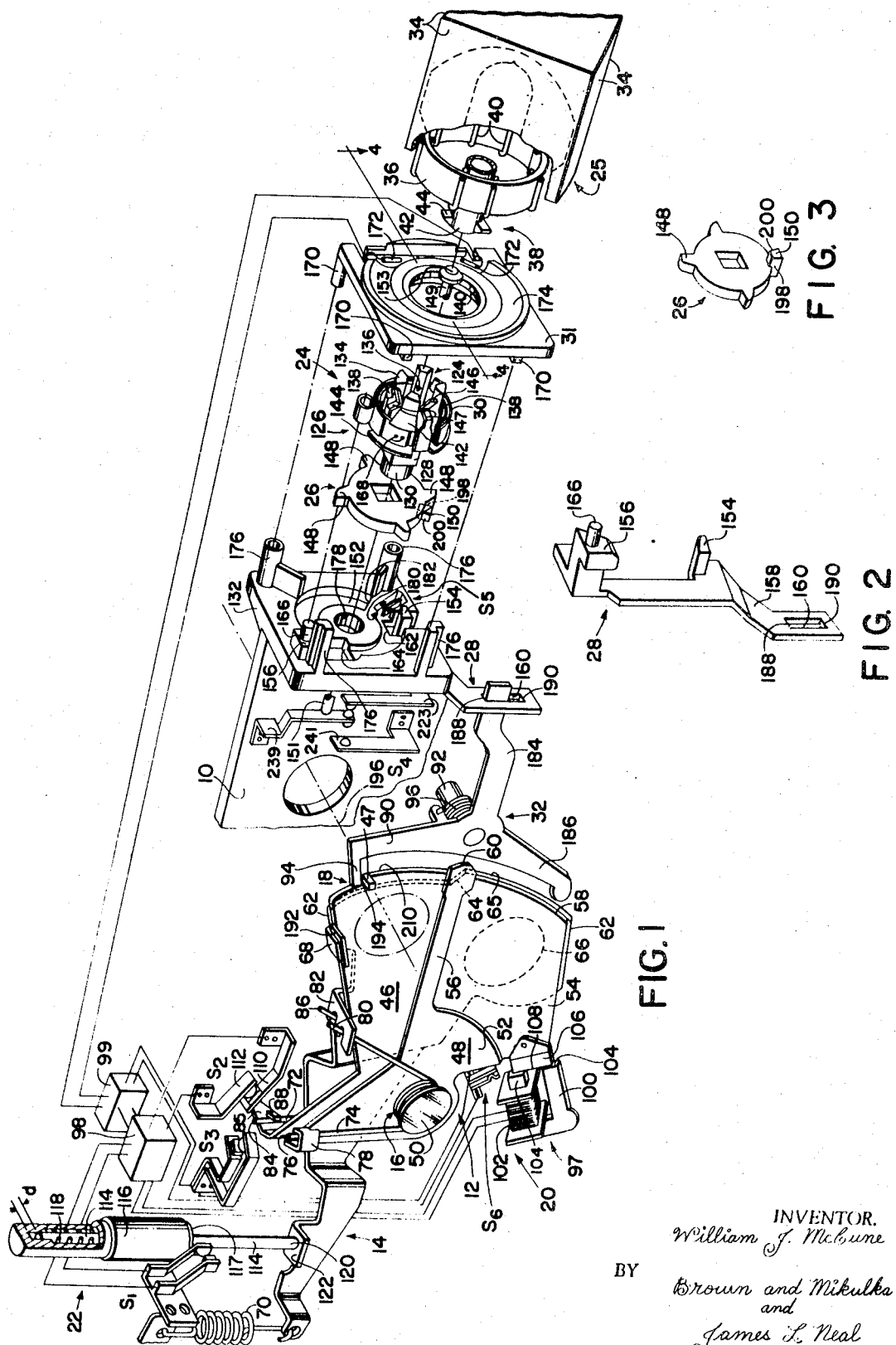

INVENTOR.
William J. McCune

BY

Brown and Mikulka
and
James L. Neal
ATTORNEYS

PHOTOGRAPHIC EXPOSURE CONTROL APPARATUS

SUMMARY OF THE INVENTION

This invention contemplates photographic exposure control apparatus including an exposure control circuit calibrated for operation according to one mode during photography under steady state illumination and calibrated for operation according to a second mode during photography with photoflash illumination. The two modes of operation will hereafter be referred to as the ambient mode and the flash mode, respectively.

The invention is particularly applicable to apparatus usable in conjunction with a multilamp photoflash assembly wherein the apparatus is automatically conditioned for operation according to the flash mode when the multilamp photoflash assembly is operatively installed to locate one lamp in position for ignition in timed relationship to a photographic exposure and is subsequently conditioned for operation according to the ambient mode when the last lamp of the photoflash lamp assembly moves from the operative position.

It is an object of this invention to provide improved photographic exposure control apparatus which is automatically operable according to a flash mode when photoflash illumination is used and automatically operable according to an ambient mode under conditions of steady state illumination.

Other object objects of this invention will in part be obvious and will in part appear hereinafter.

BRIEF DESCRIPTION OF THE DRAWINGS

FIG. 1 is a partially exploded perspective view of one embodiment of the invention;

FIG. 2 is a perspective view of an element of the apparatus shown in FIG. 1;

FIG. 3 is a perspective view of another element of the apparatus of FIG. 1 showing the side thereof opposite the side shown in FIG. 1;

DETAILED DESCRIPTION OF THE DRAWINGS

Figure 4:
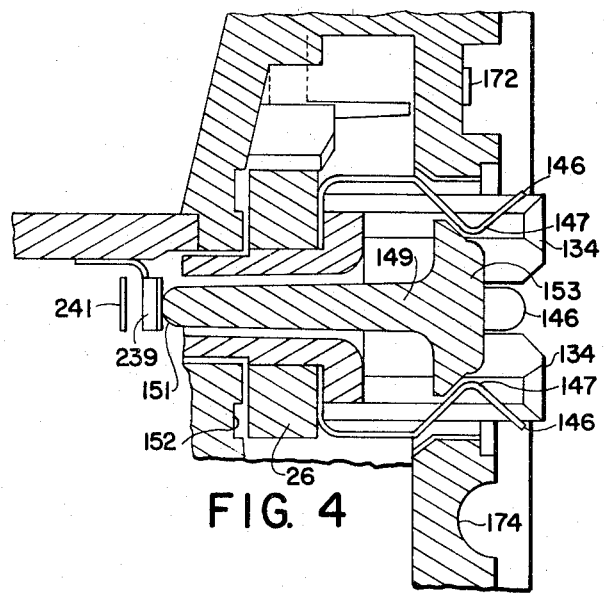
FIG. 4 is an assembled cross sectional view along line 4-4 of FIG. 1.

Reference is now made to FIG. 1 wherein there is shown the apparatus of a preferred embodiment of this invention which includes a photographic shutter and means for mounting and sequentially igniting a plurality of photoflash lamps. The shutter means includes means 10 defining an exposure aperture, shutter blade means 12, blade control means 14, drive means 16, latch means 18, retaining means 20 and operating means 22.

The photoflash lamp mounting and igniting means includes rotatable socket means 24 for detachably receiving multilamp photoflash assembly 25, escapement wheel 26 mounted adjacent the socket means, slide 28 for controlling movement of the escapement wheel, cover 31, base 132 and motion-transmitting means 32 extending from latch means 18 to engagement with slide 28 for transmitting motion of shutter 12 to slide 28.

The preferred embodiment herein described may be used in conjunction with a multilamp photoflash assembly which may, for example, be of the type designated by numeral 25 in FIG. 1. This package comprises a generally cubic housing supporting a photoflash lamp and an individual reflector therefor in each of its four faces designated by the numeral 34. The assembly is provided with a base portion defining contact-supporting ring 36 and mounting structure 38. The contact ring locates terminals 40 of each bulb for selective contact with a pair of cooperating terminals included within the package rotating apparatus, as will be subsequently described. The mounting structure includes a depending cylindrical center post 42 and four outwardly extending lugs 44 spaced uniformly about the outward extremity of the post. The structure mates with socket means 24, to be subsequently described.

The photographic shutter means will now be described.

Shutter blade means 12 includes opening blade means 46 and closing blade means 48, each pivotally mounted upon hub 50 for aperture blocking and unblocking movement. The closing blade means includes support portion 52 and blade portion 54. The support portion is pivotally mounted upon hub 50, in overlying relationship to opening blade means 46. Blade portion 54 is mounted upon support portion 52 so that it lies in coplanar relationship with blade 46. In the position of FIG. 1, an edge of blade portion 54 abuts an edge of blade 46. Elongated portion 56 of support 52 forms a light seal along the abutting edges. Blade means 48 also includes surface 58 and cam 60. Blade 46 includes offset 47.

Blade control means 14 comprises capping blade 62 pivotally mounted upon hub 50 for movement between first and second positions. The capping blade forms cam 64 and aperture 66 and supports abutment 68. Cam 64 is located radially inwardly of cam 60 on blade 48. The purposes of the cams will hereafter be apparent. The abutment extends into the path of movement of the opening blade means and, due to the abutting relationship of the opening and closing blades, limits counterclockwise movement of both the opening and closing blades. Spring 70 continuously biases the capping blade in a clockwise direction toward its first position. When the capping blade moves toward its first position, abutment 68 engages opening blade 46 and urges the opening blade and closing blade 48 clockwise, toward their respective aperture blocking and unblocking positions. Retaining means 20 is positioned adjacent the aperture unblocking position of closing blade 48 for limiting clockwise motion. Since spring 70 continuously biases the control means in the clockwise direction, blade 48 is continuously and firmly pressed against the retaining means, for reasons which will hereafter be described.

Drive means 16 includes drive springs 72 and 74 for blade 46 and blade 48, respectively. Spring 74 is coiled about hub 50 and includes end portion 76 which extends outwardly from hub 50 and engages closing blade 48 at 78 and end portion 80 which extends outwardly from the hub and engages control means 14 at 82. Similarly, spring 72 is coiled about the hub and includes end portions 84 and 86 which extend outwardly from the hub and engage opening blade 46 at 88 and control means 14 at 82, respectively. Drive spring 72 is preloaded to bias the opening blade for counterclockwise rotation, about the hub while biasing the capping blade for clockwise rotation, thus biasing the opening blade against the abutment 68 of the capping blade. Spring 74 is preloaded to bias the closing blade for counterclockwise rotation about the hub while biasing the capping blade. All three of the above-described blades may be moved together, as a unit, without influencing the condition of drive springs 72 and 74; the condition of the drive springs being affected only when there is relative motion between the blades. The preloaded condition of the springs serves to maintain the elements in their proper relative post positions when the apparatus is in the rest position.

Latch means 18 for releasably holding opening blade 46 in its aperture blocking position against the bias of spring 72 includes arm 90 pivotally mounted upon pin 92, projection 94 extending for from the end of arm 90 for releasably engaging an offset portion 47 of opening blade 46 and spring 96 for exerting a counterclockwise bias upon are arm 90.

Retaining means comprises a releasable electromechanical holding device 97 responsive to electrical circuit means 98 for controlling exposure duration in accordance with scene brightness.

The holding device may involve an electromagnet including U-shaped core 100 and electrically energizable coil 102 wound around the one leg of the core, coil 102 being included in circuit 98. The free ends, 104, of the core are coplanar and cooperable with magnetizable keeper 106 mounted upon closing blade means 48. The core of the electromagnet is positioned adjacent the aperture unblocking position of the closing blade means for contact with the keeper when the closing blade is in the aforesaid aperture unblocking position, the core and keeper being so arranged that surface 108 of the keeper contacts surfaces 104 of the U-shaped core to define a magnetic circuit. When coil 102 of the electromagnet is energized, a sufficient magnetomotive force is applied to the magnetic circuit to hold the keeper against the core and thus retain the closing blade in aperture unblocking position.

Figure 6:
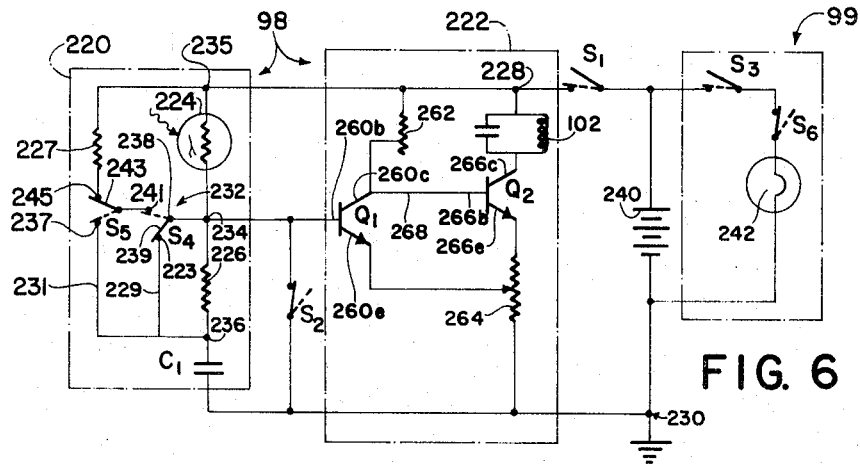
FIG. 6 is a schematic representation of a control circuit usable in conjunction with this invention.

One example of circuit means 98 suitable for use with the exposure control apparatus of this invention is shown in FIG. 6. This circuit means incorporates timing circuit 220 and trigger circuit 222.

Timing circuit 220 is connected between terminals 228 and 230 of circuit means 98 so as to form an integrator circuit, the input terminal of which is at 228 and the output terminal of which is between resistance element 226 and photoresponsive element 224 at connection 234. Connection 234 is connected by fixed impedance 238 to the base electrode of transistor $Q_1$ of trigger circuit 222.

The timing circuit includes photoresponsive element 224, such as a cadmium sulfide photocell or the like exposed to light from the scene being photographed and characterized by a resistance related to the level of scene brightness, capacitor $C_1$ and resistance element 226. Resistance element 226 is a compensating system which is effectively included in circuit 220 during operation according to the flash mode, and show shorted out during operation according to the ambient mode. Lines 229 and 231 extend from terminal 236, in parallel with resistor 226 and define terminals 233 and 237 respectively. Lines 229 and 231 serve to facilitate the switching of the circuit between flash and ambient modes as will hereafter be described. Circuit 220, in the preferred embodiment, includes resistor 227 arranged for parallel connection with element 224 during photoflash operation for limiting the duration of the exposure interval during operation according to the flash mode to a predetermined maximum period of time. Element 224 m normally controls the duration of the exposure interval. However, when the level of light reflected from the scene to be photographed is low, an undesirably long exposure interval may be produced. When this condition exists, the resistance of element 224 is higher than the resistance of resistor 227, thus permitting resistor 227 to control. The timing circuit further includes switching means 232, which may embody switches $S_4$ and $S_5$, for switching the system between ambient and flash modes. Both switches are of the single pole, double throw type. Arm 239 of switch $S_4$ extends from terminal 238 and is arranged for connection with either terminal 223 and or 241; arm 243 of switch $S_5$ extends from terminal 241 for connection with either terminal 237 or 245, terminals 241 and 245 facilitating the connection and disconnection of resistor 227.

Circuit 220 thus constitutes an integrating circuit operable according to two modes. One is an ambient mode which effectively excludes both resistor 226 and 227 and to the other is a flash mode which effectively includes both of these resistors.

Trigger circuit 222 may be, for example, a transistorized two-stage Schmitt-type trigger circuit responsive to output voltage from timing circuit 220. Circuit 222 has a normally not-conducting stage that includes transistor $Q_1$ preferably of a silicon type, having base, collector and emitter electrodes 260b, 260c and 260e, respectively. Collector electrode 260c of $Q_1$ is connected to terminal 228 of the circuit means by variable bias resistor 262, and emitter electrode 260 e of $Q_1$ is connected to terminal 230 of the circuit means by variable bias resistor 264. The base of transistor $Q_1$ is initially grounded through switch $S_2$ across capacitor $C_1$. The normally conducting stage of circuit 222 includes transistor $Q_2$ having base, collector and emitter electrodes 266b, 266c and 266e, respectively. Collector electrode 266c is connected to terminal 228 through coil 102 so that the latter is energized when $Q_2$ conducts. Base electrode 266b of $Q_2$ is connected to collector electrode 260c of $Q_1$ through lead 268, and emitter electrode 266e of $Q_2$ is connected through bias resistor 264 to terminal 230. It should be noted that in this arrangement, resistor 264 is essentially a common emitter resistor. Adjustment to resistor 264 is for the purpose of establishing the voltage at which it is desired to trigger circuit 220. While the two stages of circuit have been characterized as "normally not-conducting" and "normally-conducting" it should be obvious that this characterization is applicable only when a voltage source is applied across terminals 228 and 230.

Voltage source 240 is shown in the form of a battery of potential $E_0$ connected between terminal 228 and terminal 230 through normally open switch $S_1$. Switch $S_1$ is closed to apply voltage across the terminals by operator means 22 which also initiates exposure producing operation of the shutter means.

Operator means 22 includes shaft 114, knob 116 and spring 118. The shaft is mounted for reciprocal movement relative to hub 50; end 120 thereof is engageable with offset 122 of control means 14 for imparting counterclockwise rotation to the control means when the operator means is moved downwardly. Spring 118 biases knob 116 and shaft 114 in opposite directions axially of the shaft. Spring 118 is substantially weaker than spring 70 so that, upon depression of knob 116, the knob will move downwardly through distance "d" before movement is imparted to the shaft. The knob includes cam 117 for operating switch $S_1$.

In the shutter mechanism, the first shutter blade is movable from an initial aperture-blocking position to an aperture-unblocking position for initiating exposure and the second blade is movable from an initial aperture-unblocking position to an aperture-blocking position for terminating exposure. The second blade is releasably retained in its aperture-blocking position subsequent to movement of the first blade to its aperture-unblocking position by energized electromagnetic means. Circuit means 98 is designed to cut off the flow of current to the electromagnet to free the second blade for movement to its aperture-blocking position a timed interval after aperture-unblocking movement of the first blade.

Switch $S_2$ is installed adjacent the opening blade 46 and may include poles 110 and 112 wherein pole 110 is biased out of contact of pole 112 and adapted to be thrown into contact therewith when the opening blade is in its initial aperture blocking position.

Operation of circuit means 98 according to the ambient mode will now be described. This description will be taken in connection with circumstances wherein arm 239 of switch $S_4$ is in contact with terminal 241 and arm 243 of switch $S_5$ is in contact with terminal 237. In this manner the circuit through resistor 227 is broken and resistor 226 is shorted out by completion of a circuit through line 231. When switch $S_1$ is initially closed, circuit 220 is grounded so that the flow of current through resistors 262 and 264 establishes a reverse bias condition on the base emitter junction of transistor $Q_1$ to cut the latter off.

The stage of circuit 222 incorporating transistor $Q_2$ includes base electrode 22 266b as the transistor input, collector electrode 266c as the transistor output, and emitter electrode 266e, common to the input and output. Resistor 262 coupled between input electrode 266b and terminal 228 acts as a fixed base resistor for providing, when $S_1$ is closed, a fixed base current bias that causes $Q_2$ to conduct instantaneously with the closing of $S_1$. The setting of variable resistor 262 establishes the degree to which $Q_2$ conducts so that the current in solenoid coil 102 can be adjusted to provide the proper magnetomotive force in the magnetic circuit of holding device 97, for preventing accidental release of closing blade 48 when the opening blade moves to aperture unblocking position to initiate exposure. The flow of current through resistors 262 and 264, when $Q_2$ conducts, establishes at the collector and emitter electrodes of $Q_1$, bias voltages having first values dependent upon the magnitudes of the respective currents and resistance values.

The contacts of $S_2$ are maintained in a closed condition until displacement of the opening blade out of its blocking position. Connection 234 is characterized by an initial value of voltage, namely ground potential, at the instant $S_1$ is closed. When the voltage at connection 234 is at its initial value and the voltages at the collector and emitter electrodes of $Q_1$ are at their first values of bias voltage due to the conduction of $Q_2$, the collector-base and emitter-base junctions of $Q_1$ are reversed biased, thus cutting off transistor $Q_1$. For this reason, it may be said that the bias of $Q_1$ is primarily established by the voltage at connection 234.

During the interval after $S_1$ is closed and before $S_2$ is opened, the current through the solenoid builds rapidly to its maximum value causing the maximum retaining force to be exerted on the closing blade. The initial movement of the opening blade causes disengagement of the contacts of $S_2$, thereby opening the same to apply the voltage source across circuit 220 to activate the same.

The opening of $S_2$ causes circuit 220 to generate a voltage at connection 234. The voltage is of a value which causes $Q_1$ to be reverse biased and cut off; the value then changes with time, reaching a preselected value, termed the trigger voltage, which forward biases the emitter base junction of transistor $Q_1$, in a period of time termed the trigger generation time. Element 224 then functions like a base resistor, the value of which is dependent upon the level of scene brightness, and provides base current bias that causes $Q_1$ to conduct, producing collector current at the output electrode thereof which flows through resistor 262 increasing the voltage drop thereacross, thus lowering the voltage at the input electrode of $Q_2$. This reduces the forward bias on $Q_2$, thus decreasing the flow of current through the latter and causing a reduction in the voltage drop across bias resistor 264 thereby increasing the forward bias on $Q_1$ even more. This regenerative feedback between the stages of voltage sensitive trigger circuit 222 will cause conduction to switch rapidly from $Q_2$ to $Q_1$. The different flows of current through bias resistors 262 and 264 after switching takes place establish second values of bias voltages at electrodes 260c and 260e of $Q_1$ such that the conduction of $Q_2$ is severely and rapidly reduced, thereby rapidly deenergizing coil 102. Deenergization of the coil effects rapid release of keeper 106.

When the steady state or ambient illumination drops below the design level at which the exposure duration becomes greater than about 125 ms., it becomes impractical to hold the camera by hand sufficiently steady to achieve consistently good results. In such case, flash illumination must be used. To this end, flash circuit 99 including flash ignition switch $S_3$, safety switch $S_6$ and means for supporting and illuminating flash lamp 242 are connected across battery 240. Flash illumination is also required where the film being used is color balanced for daylight, for example, and the ambient illumination has a different color temperature. In either event, switch $S_3$ is normally open and switch $S_6$ is normally closed as shown in FIG. 6, but portion 85 of opening blade 46 engages one arm of the switch when the blade moves toward its opening position and flexes the one arm into engagement with the other arm to close the switch. In point of time, the closing of $S_3$ occurs about the same time the opening blade reaches unblocking position. This means that the light output from the flashbulb begins to increase about the same time the opening blade reaches unblocking position; the light reflected from the scene being photographed then influences the current flow through element 224 and the charge of capacitor $C_1$.

It should now be noted that opening blade 46 requires a finite time, termed the opening blade delay, to move from its terminal blocking position to its intermediate position at which exposure is initiated. When the solenoid is deenergized, closing blade 48 requires a finite time, termed the closing blade delay, to move from its terminal unblocking position to its intermediate position at which exposure is terminated. By making two blade delays the same, the trigger generation time is essentially equal to the exposure time even though the two times are not concurrent. And, since the time between the closing of $S_1$ and the initial movement of the opening blade is so small in comparison to the exposure time, it may be said that the exposure time is essentially the time that the solenoid is energized. Because the resistance of element 224 is functionally related to the level of scene brightness, the exposure time is also functionally related to the level of scene brightness. With proper design, the amount of light received by the film (time integral of brightness evaluated between the initiation and termination of exposure) will be substantially constant over a wide range of levels of scene brightness. In other words, the amount of light received by the film is substantially independent of the level of scene brightness and the manner in which it changes with time.

It can be appreciated that very little light from the flashbulb will be reflected from the subject into exposure aperture 10 in the time interval between the closing of $S_3$ and the movement of the opening blade to unblocking position. Most flash bulbs peak about 20 ms. after ignition which means that if an exposure of about one-thirtieth second is desired, the exposure must terminate about the time that the light output of the bulb peaks. The opening blade delay is substantially equal to the closing blade delay; it is thus apparent that considerably more light will be reflected from the subject into exposure aperture 10 during the closing blade delay than during the opening blade delay. Even if the element 224 can accurately track the changes in brightness produced by the changing output of the flashbulb, the time integral of light falling on the film under flash illumination conditions will not be the same as when the light is steady state since the amount of light received by the film during the closing blade delay greatly exceeds the light received during opening blade delay. Obviously, more light than is required for proper exposure will fall on the film, with the result that means must be provided for reducing the trigger generation time under flash illumination conditions. To this end, compensating resistor 226 is in series with capacitor $C_1$ is provided for photography wherein flash illumination is used. The presence of this resistor serves to establish at terminal 234, a voltage different from the voltage at terminal 230 at the instant after switch $S_2$ is opened. Thus, the voltage differential across element 224 upon initiation of timing is less than when resistor 226 is not present, and the voltage at terminal 234 is closer to the trigger voltage. In this manner, the triggering of voltage-sensitive circuit 222 is advanced sufficiently to reduce the total light received by the film to a value closer to the correct value, the degree of correction being dependent upon the value of the resistor and the ambient light level.

Since it is not desirable to advance the triggering of the trigger circuit during photography under ambient light conditions, resistor 226 is not then effectively included within the timing circuit. Further, during photography in ambient light conditions, the circuit through resistor 227 must be broken. Thus when the system is converted from operation according to the ambient mode to operation according to the photoflash mode, resistors 226 and 227 must be effectively included within the circuit. Given the ambient mode conditions set forth above wherein pole 239 of switch $S_4$ contacts terminal 223 and pole 243 of switch $S_5$ contacts terminal 245, the resistors may be included by operating switch $S_4$, in a manner hereafter described, so that pole 239 breaks contact with terminal 223 and makes contact with terminal 241. Referring to FIG. 6, it can be seen that resistor 227 will then be connected in parallel with photosensitive element 224 and that the short of resistor 226 previously effected through line 229 is removed.

When operation is according to the photoflash mode, the circuit functions in the manner described above except that the presence of resistor 226 reduces the trigger generation time and thus the duration of the exposure interval, also in the manner described above. Resistor 227 in parallel with photoresponsive element 224 serves to limit the duration of the exposure interval to a predetermined fixed time under conditions wherein relatively little light is reflected from the scene to be photographed onto the photoresponsive element but, under other conditions, it has no effect. The function of resistor 227 is fully described in U.S. PAT. No. 3,326,103 which issued to J. M. Topaz on June 30, 1967.

It should now be observed that switch $S_5$ can be operated to return the circuit to a condition for photography according to the ambient mode without operation of switch $S_4$. Switch $S_5$ is operated so that pole 243 breaks contact with terminal 245 and makes contact with terminal 237, the circuit through resistor 227 is broken and resistor 226 is effectively shorted out by a circuit completed through line 231.

The photoflash lamp mounting and igniting means will now be described.

Socket means 24 includes element 124 and member 126. Element 124 includes angularly configured collar 128 for fixedly mounting escapement wheel 26 and circular shaft portion 130 extending from the collar for rotatably mounting element 124 in support plate on base 132. The element further includes four equally spaced extensions 134 surrounding a central opening 136 which extends through collar 128 and shaft 130, centrally thereof. One pair of opposed extensions include bearing shoulders 138 for cooperation with thrust bearing 140 on member 31. The other pair of opposed extensions include bearing shoulders 142. Shoulders 142 are larger than shoulders 138 to act as retainers for spring 30 as well as to cooperate with bearing surface 140. Member 126 comprises flat platelike portion 144 from which four spring fingers 146, including offsets 147, have been struck and bent upward for location between extensions 134. An opening, not shown, having a shape complementary to that of collar 128, is disposed centrally of portion 144 so that member 126 may be mounted upon the collar, between escapement wheel 26 and element 124. By this arrangement, assembly 25 is releasably retained in the socket means.

Switch $S_4$ is mounted adjacent the side of base 132 opposite escapement wheel 26 and positioned for operation by an elongated member 149. Elongated member 149 defines end 151 and enlarged head 153, and extends through opening 136 into engagement with resilient pole 239 of switch $S_4$. Fixed terminals 223 and 241 of switch $S_4$ are positioned on opposite sides of resilient pole 239, and pole 239 is resiliently biased into contact with terminal 223. Due to the engagement between member 149 and resilient pole 239, pole 239 continuously biases member 149 toward offsets 147 on fingers 146 so that head 153 is biased into engagement with the offsets.

When photoflash assembly 25 is to be installed, center post 43 is advanced into opening 136 so that lugs 44 pass between extensions 134 and press against offsets 147 of spring fingers 146. As the post is inserted, spring fingers 146 are cammed outward and over the lugs, into retaining engagement with them. Simultaneously with advancement of post 44 into opening 136, member 149 is depressed to move pole 239 of switch $S_4$ out of contact with terminal 223 and into contact with pole 241. Assembly 25 is removed by simply pulling it from the socket means with sufficient force to again cause spring fingers 146 to cam over lugs 44. Pole 239 then moves back into contact with terminal 223 and returns member 149 to its position against offsets 147.

Escapement wheel 26 is mounted, as aforesaid, upon collar 128 of element 124. The escapement wheel is thus fixedly mounted relative to element 124 and rotatable relative to base 132. Four teeth 148 extend radially from the wheel for cooperation with slide 28 and projection 150 extends from one tooth for cooperation with circular slot 152 in base 132.

Base 132 also mounts switch $S_5$. Switch $S_5$ is positioned so that resilient pole 243 thereof is operated by projection 150 of escapement wheel 26 during a final rotary movement thereof. Fixed terminals 245 and 237 are mounted on opposite sides of pole 243, and the pole is resiliently biased into contact with terminal 245. During final rotation of the escapement wheel, projection 150 engages end 247 of pole 243 and moves it against its bias to break contact with terminal 245 and make contact with terminal 237.

Slide 28 carries first pallet 154 and second pallet 156 and is mounted in base 132 for reciprocal sliding movement. Movement of slide 28 permits controlled rotation of escapement wheel 26 and hence socket means 24. Extension 158 of the slide forms opening 160 for operatively receiving motion-transmitting member 32. Opening 160 is elongated to permit a predetermined amount of movement of the slide. The slide is mounted beneath base 132 and pallets 154 and 156 extend through openings 162 and 164 of the base for their engagement with the escapement wheel. Post 166 extends upwardly from pallet 156.

Drive spring 30 comprises a coil spring wound about a core formed by curved surfaces of extensions 134 of element 124. One end of the spring is fixedly mounted to one of the extensions at 168; the other end is attached to post 166. The spring is wound to bias the rotary parts for counterclockwise movement and to bias the slide for movement in the upward direction.

Cover 31 include includes thrust bearing 140, members 170, terminals 172 and channel 174. Terminals 172 cooperate with terminals 40 to place the flashlamp directed toward the scene to be photographed in photoflash circuit 99. Channel 174 permits unobstructed movement of terminals as the photoflashlamp assembly rotates. Members 170 cooperate with members 176 of base 132 to mount the cover to the base so that socket means 24, drive spring 30 and wheel 26 are supported between them. Shaft 130 extends through circular opening 178 in the base; bearing shoulders 138 and 142 are retained by thrust bearing 140.

Circular slot 152 in base 132 includes an interrupted sector which defines slot ends 180 and 182 for controlling photoflashlamp package rotation as hereafter described.

Motion-transmitting means 32 extends from latch means 18 as an integral part thereof and comprises finger 184 which extends through opening 160 in the slide and stop 186. Spring 96 biases member 32 and latch means 18 for counterclockwise rotation about pivot 92, thus finger 184 urges the slide upward. The finger will normally engage upper extremity 188 of opening 160. Motion-transmitting means 32 is movable through first and second increments of clockwise rotation, as will hereafter be explained. The first increment of clockwise rotation advances finger a predetermined distance downwardly to lower extremity 190 of opening 160. Downward motion is so limited that the finger is not sufficiently advanced to transmit motion to the slide. Stop 186 extends from the motion-transmitting member to engage an edge of blade means 48 and positive limit downward motion of finger 184 until other operations take place. When the second increment of downward motion is imparted to the finger, it drives slide 28 downward against the bias of spring 30.

Operation of the above apparatus will now be described. The description will assume an initial ambient mode setting and describe conversion to the flash mode, operation according to the flash mode and conversion back to an ambient mode setting.

Reference will now be made to FIG. 1 wherein the apparatus is shown in the rest position wherein projection 150 abuts slot end 180. Opening blade 46 and closing blade 48 are in abutting relationship so that clockwise movement of the opening blade produces similar movement of the closing blade. Spring 70 continuously biases control means 14 for clockwise movement. Abutment means 68 extends from the control means into engagement with surface 192 of the opening blade so that the clockwise bias of the control means also biases the opening and closing blades for the same movement. Core 100 of the electromagnet is located so that surfaces 104 thereof are contacted by surface 108 of keeper 106 upon blade 46 to limit clockwise movement of blades 46, 48 and 62 so that blades 46 and 62 are located in their aperture-blocking positions and blade 48 is located in aperture-unblocking position. Since spring 70 continuously biases the blades for clockwise movement, keeper 106 is continuously pressed into firm contact with surfaces 104 of the core. A small tolerance gap 194 is formed by the opening blade and latch means 18.

The photoflash apparatus is shown in its unwound condition wherein socket means 24 is so positioned that each of the four faces 34 of an assembly 25 installed in socket means 24 would be orientated at approximately a 40° angle relative to a plane of the scene being photographed (i.e. relative to a plane perpendicular to the optical axis 196). In this condition, surface 198 of projection 150 abuts end portion 180 of slot 152 to prevent further rotation of the assembly and to locate teeth 148 of the escapement wheel so that pallets 154 and 156 of slide 28 do not intercept the teeth upon up-and-down movement thereof. Projection 150 engages end 247 of pole 243 and holds the pole, against its bias, in contact with terminal 237. For purposes of discussion it will be taken that, in this unwound condition, photoflash assembly 25 is not installed. Pole 239 of switch $S_4$ is thus in contact with terminal 223 in accordance with its bias. The circuit is thus set for operation according to the ambient mode, resistor 226 being short circuited through line 229 and resistor 227 being disconnected by the condition of both switches $S_5$ and $S_6$. In the above-described unwound condition, the aforesaid 40° orientation of assembly 25 serves to indicate that operation is according to the ambient mode and, if photoflash photography is desired, a fresh photoflashlamp supply is needed.

This is the condition, in the ambient mode, from which photography according to the flash mode is typically initiated.

To initiate photography according to the flash mode, a photoflashlamp package, or assembly, designated 25, is inserted into and retained within the socket means as described above. Insertion of assembly 25 moves member 149 to thereby move pole 239 against its bias, out of contact with terminal 223 and into contact with terminal 241. The assembly is then manually rotated clockwise to tension drive spring 30. As the rotation occurs, projection 150 moves away from pole 243 of switch $S_5$ and along circular slot 152 until surface 200 thereof abuts end 182 of the slot. Movement of projection 150 for from pole 243 permits the pole to disengage terminal 237 and engage terminal 245, in accordance with its bias. Thus when assembly 25 is inserted and rotated, lines 229 and 231 are both open; resistor 226 is effectively in series with photoresponsive element 224 and capacitor $C_1$; resistor 227 is connected in parallel with element 224; thus the circuit is set for operation according to the flash mode.

The shapes of pallets 154 and 156 and teeth 148 a of the escapement wheel are such that manual clockwise rotation of socket means and escapement wheel is freely permitted. The ends of the circular slot are so located that the photoflashlamp package is permitted to move through an angular rotation of approximately 320°. When surface 200 abuts end 182 of slot 152 none of the faces of assembly 25 are precisely directed toward the scene to be photographed since approximately 10° of overtravel is provided. Upon release of the assembly, after manual rotation the tension in drive spring 30 advances socket means 24 and escapement wheel 26 substantially 10° counterclockwise to take up the overtravel and position the assembly so that one face thereof is directed toward the scene to be photographed, one of the teeth 148 then being releasably retained by pallet 154 to prevent further rotation of the escapement wheel under the influence of the drive spring. When this position is obtained, the terminals for the one flash flashlamp directed toward the scene to be photographed are in electrical contact with terminals 172 of the photoflash apparatus. The one flash flashlamp is thus positioned in the photoflash circuit to be ignited in timed relationship with exposure-producing operation of the apparatus.

The events which occur as a result of downward movement of knob 116 and shaft 114 to produce an exposure will now be described.

Initial downward movement of the knob through distance "d" causes switch-operating cam 117 thereon to close the contacts of switch $S_1$. Closure of switch $S_1$ energizes timing circuit 98 and coil 102 of an electromechanical holding device 97 to prevent forward movement closing blade means 48 according to the bias of its drive spring, which movement would otherwise occur upon the subsequent movement of blade 46.

Energization of the coil provides, in the magnetic circuit of core 36 and keeper 30, a magnetic induction sufficiently large to create a force on the keeper for holding the closing blade in its initial position against the bias of its drive spring independently of movement of opening blade 46.

Further downward movement of the knob effects downward movement of shaft 114. End 120 thereof engages offset 122 of control means 14 and rotates the control means counterclockwise from its first position toward its second position, against the bias of spring 70. Movement of the control means removes abutment means 68 from engagement with surface 192 of the opening blade. The opening blade moves slightly within its aperture-blocking position to close gap 194 and is releasably held in aperture-blocking position by latch means 18.

Counterclockwise movement of control means 14, while movement of the opening and closing blade is arrested, "winds" drive springs 72 and 74 to store a predetermined amount of energy therein in addition to the energy stored therein due to the preloaded condition. Control means 14 ultimately reaches a position wherein cam surface 64 engages projection 94 of latch means 18. A further increment of movement carries the control means to its second position wherein it lies in unblocking relationship with the exposure aperture. The aforesaid further increment of movement causes cam surface 64 to move projection 94 clockwise, off opening blade 46, to release the opening blade for movement. Projection 94 continues to ride upon raised surface 65 of cam 64 and thereby prevents return movement of the latch under the influence of biasing spring 96. Movement of the latch causes a first clockwise movement of finger 184 and stop 186. The finger is moved downwardly within slot 160 of slide 28 to a position wherein the end thereof is positioned adjacent lower extremity 190 of the slot. Stop 186 moves into engagement with surface 58 of closing blade 48 for limiting movement of the finger to prevent inadvertent overtravel thereof which would cause premature movement of slide 28.

The opening blade moves toward its aperture-unblocking position, under the influence of drive spring 72, to initiate an exposure interval. During its movement, the opening blade opens switch $S_2$ to activate circuit means 98 to initiate the timing operation and closes switch $S_3$ to ignite the photoflashlamp directed toward the scene to be photographed in timed relationship to initiate aperture-unblocking movement of the opening blade.

The timing operation initiated by opening of switch $S_2$ is completed, in the manner described above, a predetermined interval after initiation thereof. The completion of the timing operation deenergizes coil 102. Spring 74 acting on closing blade 48 then advances the closing blade toward and to its aperture blocking position to end the exposure interval. In its aperture-blocking position, the closing blade abuts the opening blade and is biased toward continuous contact therewith by spring 74.

Safety switch $S_6$ is provided in series with switch $S_3$ for opening photoflash circuit 99 when the closing blade begins to move toward aperture-blocking blocking position. Switch $S_6$ is biased open and held closed by the presence of closing blade 48 in its aperture-blocking position. In this manner, circuit 99 is completed when switch $S_3$ is first closed, thus igniting the photoflashlamp and is subsequently opened by switch $S_6$ in response to initial movement of the closing blade. The opening of circuit 99 by switch $S_6$ prevents successive photoflashlamps advanced to operative position immediately after each exposure and prior to the opening of switch $S_3$, in a manner hereafter described from being prematurely ignited.

During movement of the closing blade toward its aperture-blocking position, surface 58 of the closing blade moves away from stop 186 to permit further clockwise movement of latch 18 and motion-transmitting means 32. Cam 60 extends radially outwardly from the closing blade and radially beyond raised surface 65. Thus, upon aperture-blocking movement of the closing blade, cam 60 strikes projection 94 of latch 18 to impart a second clockwise movement of the lath latch and therefore to finger 184. The latch and the finger, at this point, act as an operator for the escapement mechanism. This second movement of the finger drives slide 28 downward, against the upward bias of spring 30. Cam surface 60 passes from beneath projection 94 to permit projection 94 to return to contact with raised surface 65 and to permit finger 184 to return to the position it occupied after its first clockwise movement. Spring 30 returns the slide to its upper position upon return of finger 184 to the aforesaid position. A quick down-and-up movement of the slide is thus obtained.

Downward movement of the slide disengages first pallet 154 from the tooth 148 of the escapement wheel with which it is engaged to permit rotation of the wheel, under the influence of spring 30. The escapement wheel advances to an intermediate position wherein another of the teeth designated 148 is engaged by pallet 156. Upward movement of the slide displaces pallet 156 from the tooth with which it is engaged and thus permits further rotation of the escapement wheel. The two increments of rotation permitted by the down-and-up movement of the slide produce an amount of rotation appropriate for locating the next succeeding flashlamp in electrical contact with terminals 172. It should be observed that, except for the open switch $S_6$, circuit 99 would be complete at this point and the lamp would be prematurely ignited.

Upon each successive exposure-producing operation of the shutter, the escapement wheel advances in the above manner to direct successive lamps toward the scent scene to be photographed and locate their terminals in contact with terminals 172. When the last (fourth) photoflashlamp is directed toward the scene to be photographed, projection 150 on the escapement wheel 26 is positioned along circular slot 152 so that surface 198 thereof is angularly displaced from end 180 of the circular slot by approximately 40°, as seen in FIG. 5.

Figure 5:
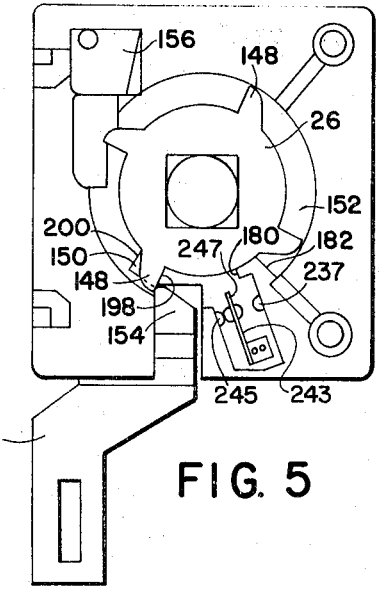
FIG. 5 is an assembled plane view showing a portion of the apparatus of FIG. 1.

In response to operation of the shutter, downward movement is imparted to slide 28, as described above, to permit the tooth of the escapement wheel, shown in FIG. 5 as retained by first pallet 154, to be released for movement under the influence of drive spring 30. Second pallet 156 moves downward into position for engaging another of the teeth 148 of the escapement wheel as described above, but just prior to engagement of the second pallet by one of the teeth, surface 198 of projection 150 abuts end 180 of circular slot 152 to terminate rotation of wheel 26 and thus the photoflashlamp package. The photoflash apparatus is now returned to its original position wherein the teeth of the escapement wheel are so located that they are not engageable by the first and second pallets, and the faces of the photoflashlamp package are all oriented at approximately a 40° angle relative to the plane of the scene to be photographed to indicate that all the lamps in the package are exhausted and that the apparatus is set for photography according to the ambient mode.

Just prior to movement of projection 150 into abutting relationship with end 180 of slot 152, the projection engages end 247 of pole 243 to move the pole against its bias out of contact with terminal 245 and into contact with terminal 237. When this occurs a short circuit is completed across resistor 226 through line 231, pole 239 of switch $S_4$ being in contact with terminal 241, and the circuit through resistor 227 is broken. Timing circuit 220 is thus automatically returned for operation according to the ambient mode without removal of assembly 25. If assembly 25 is removed, pole 239 of switch $S_4$ disengages terminal 241 and engages terminal 239 but no change in the operation of the circuit takes place. The short of resistor 226 is effected through line 229 instead of line 231.

After termination of the exposure interval and rotation of the photoflashlamp package, knob 116 is released. Spring 118 raises knob 116 relative to shaft 114; spring 70 rotates control means 14 in the clockwise direction toward and to its first position, and offset 122 of the control means lifts shaft 120 upwardly to its raised position. Upward movement of knob 116 opens switch $S_1$ and thus breaks circuit 98. During clockwise rotation of the control means, abutment means 68 engages surface 192 of opening blade 46 to rotate the opening blade in the clockwise direction toward and to its aperture blocking position and the abutting relationship between the opening blade and closing blade 48 effects rotation of the closing blade toward and to its aperture-unblocking position. Return of the opening blade to its aperture-blocking position returns switch $S_2$ to its closed condition, permits $S_3$ to open and closes switch $S_6$.

Spring 70 exerts a continuous clockwise biasing force upon the control element; the control element in turn exerts a force upon the opening and closing blades for continuously urging keeper 106 into firm contact with core 100. It should be observed that during the respective clockwise movements of control means 14, opening blade 46 and closing blade 48, there is no relative movement between the aforesaid opening and closing blades and the control element. Thus, spring 70 does not have to exert a return force sufficient to overcome the forces of springs 72 and 74; it need only be strong enough to exert the requisite force for maintaining keeper 106 and core 100 in firm contact.

During return of the opening and closing blades and the control means, projection 94 moves off surface 65, over cam 60 and onto edge 210 of the closing blade. Projection 94 rides along edge 210 until offset portion 47 of the opening blade passes beyond it. Spring 96 then advances arm 90 in a counterclockwise direction so that projection 94 engages portion 47 of blade 46. The apparatus is thus returned to its original rest position. Upon return of the shutter means to its rest position and movement of projection 94 into engagement with portion 47, finger 184 is permitted to return to upper portion 188 of slot 160, as shown in FIG. 1.

Since human reaction time involved in depressing and releasing the shaft, and the inertial delay of the lever in returning to its normal position, substantially exceeds the longest average exposure apt to be used under normal "snapshot" conditions of scene brightness, the contacts of switch $S_1$ will be closed for at least as long as the correct exposure time.

Figure 7:
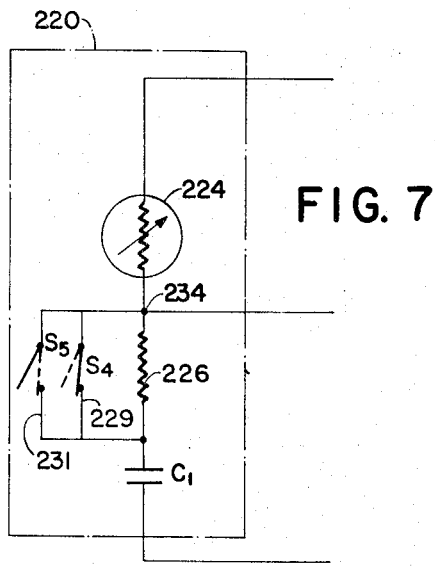
FIG. 7 is a schematic representation of a portion of the circuit of FIG. 6 showing an alternate embodiment thereof.

Reference is now made to FIG. 7 wherein there is shown a second embodiment of timing circuit 220.

Like numbers are used to indicate like parts.

In this embodiment the compensating resistor designated 227 in FIG. 6 is omitted. Resistor 226 may then be selectively included and excluded from series connection with photoresponsive element 24 and capacitor $C_1$ by means of single throw switchs switches $S_4$ and $S_5$. The apparatus comprising this embodiment is substantially that shown in FIG FIG. 1 except that poles 241 and 245 are not included within the structure.

For purposes of discussion it will be taken that, during operation according to the ambient mode, switches $S_4$ and $S_5$ are both closed and that resistor 226 is shorted out through lines 229 and 231. Upon installation of photoflashlamp assembly 25 switch $S_4$ is opened, thus breaking the circuit through line 229, and manually wound to tension spring 30. As the winding operation is initiated, switch $S_5$ is opened to open the circuit through line 231. Resistor 226 is then effectively included within circuit 220 to set the system for operation according to the flash mode. As the apparatus is operated, final rotation of the photoflashlamp assembly mounting means returns switch $S_5$ to its closed condition to establish a complete circuit through line 231 and thereby short resistor 226; the circuit is thus converted back to operation according to the ambient mode.

It should be understood that the terms "up," "down," "clockwise" and "counterclockwise" and the like are used in the foregoing disclosure to describe movement of various elements as seen in the FIGS. and are not intended to be used in a limiting sense.

Since certain changes may be made in the above apparatus without departing from the scope of the invention herein involved, it is intended that all matter contained in above description or shown in the accompanying drawings shall be interpreted as illustrative and not in a limiting sense.

I claim:

1. Photographic exposure control apparatus comprising:
   a. means for mounting and retaining a plurality of flashlamps;
   b. means for sequentially advancing said flashlamps to a predetermined operative position for ignition to illuminate a scene in timed relationship to successive photographic exposures and for removing advancing a final flashlamp away from said operative position after ignition thereof; and
   c. electrical exposure control circuit means operable according to a photoflash mode and an ambient mode, said circuit means being operable according to said photoflash mode when said plurality of flashlamps are mounted in said mounting means and one of said lamps is positioned for ignition, said circuit means being automatically operable according to said ambient mode when said final flashlamp is removed advanced from said operative scene illumination position.

2. Photographic exposure control apparatus comprising:
   a. means for detachably mounting and retaining a plurality of flashlamps;
   b. indexing means for sequentially advancing said flashlamps to a predetermined operative position for ignition in timed relationship to successive photographic exposures and for removing a final flashlamp from said operative position after ignition thereof;
   c. electrical exposure control circuit means operable according to an ambient mode and a photoflash mode;
   d. First switch means operable in response to the mounting of said plurality of flashlamps into said mounting means for placing said circuit means in a condition for operation according to the photoflash mode and for placing said circuit means in a condition for operation according to the ambient mode when said final flashlamp is removed for from said operation position; and
   e. second switch means for placing said circuit means in a condition for operation according to the ambient mode when said final flashlamp is removed from said operative position.

3. Photoflash apparatus according to a claim 2 wherein said first and second switch means are connected in parallel.

4. Photoflash apparatus according to claim 2 wherein said first switch means include at least one switch which is biased open and closed by said mounting of said plurality of flashlamps and said second switch means include at least one switch which is biased closed and opened in response to removal of said final flashlamp from said operative position.

5. A photographic camera comprising:
   a. means forming an exposure aperture;
   b. shutter means for unblocking and blocking said aperture to produce a photographic exposure interval;
   c. means for detachably mounting and retaining a plurality of flashlamps;
   d. indexing means responsive to operation of said shutter means for sequentially advancing said flashlamps to a predetermined operative position for ignition to illuminate a scene in timed relationship to successive photographic exposures, said indexing means being operative to automatically remove a final flashlamp from said operative position after ignition of said final flashlamp;
   e. electrical timing circuit means for influencing the duration of said exposure interval, said circuit means being operable according to an ambient mode and a photoflash mode; and
   f. switch means for placing said circuit means in a condition for operation according to the photoflash mode in response to the mounting of said plurality of photoflash in said mounting means for ignition in timed relationship to successive photographic exposures and for placing said circuit means in a condition for operation according to the ambient mode in response to said automatic removal of said final flashlamp from said operative position.

6. Photographic exposure control apparatus comprising:
   a. means forming an exposure aperture;
   b. shutter means for unblocking and blocking said aperture to produce a photographic exposure interval;
   c. electrical timing circuit means for influencing the duration of said interval, said circuit means being operable according to an ambient mode and a photoflash mode;
   d. means for detachably mounting and retaining a plurality of flashlamps for movement to a predetermined operative position;
   e. first switch means for conditioning said circuit means for operation according to said photoflash mode in response to the mounting of said plurality of flashlamps in said mounting means so that one lamp is in said predetermined operative position;
   f. indexing means for sequentially advancing said flashlamps to said predetermined operative position for ignition in timed relationship to successive photographic exposures and for removing a final flashlamp from said operative position after ignition of said flashlamp; and
   g. second switch means for converting said circuit means from operation according to said photoflash mode to said ambient mode in response to operation of said indexing means to remove said final flashlamp from said operative position.

7. Photographic exposure control apparatus comprising:
   a. means forming an exposure aperture;
   b. shutter means for unblocking and blocking said aperture to produce a photographic exposure interval;
   c. electrical timing circuit means for influencing the duration of said interval, said circuit means being operable according to an ambient mode and a photoflash mode;
   d. rotatable means for detachably mounting and retaining a plurality of flashlamps for successive advancement to a predetermined operative position;
   e. first switch means for conditioning said circuit means for operation according to said photoflash mode when said plurality of flashlamps is mounted in said mounting means so that one lamp is in said predetermined operative position
   f. drive means biasing said mounting means for rotary movement;
   g. indexing means permitting incremental rotation of said mounting means in response to operation of said shutter means for sequentially advancing said plurality of flashlamps to said predetermined operative position for ignition in timed relationship to successive photographic exposures, said indexing means effecting rotation of said mounting means to a terminal angular position wherein none of said plurality of flashlamps is present in said operative position after a final flashlamp of said plurality of flashlamps has been ignited; and
   h. second switch means responsive to movement of said mounting means to said terminal angular position for converting said circuit means from operation according to said photoflash mode to said ambient mode.

8. Photographic exposure control apparatus comprising:
   a. rotatable socket means for detachably mounting and retaining a multilamp photoflash assembly;
   b. electrical exposure control circuit means operable according to a photoflash mode and an ambient mode;
   c. first switch means for conditioning said circuit means for operation according to said photoflash mode in response to the mounting of said photoflash assembly in said socket means so that a flashlamp is operatively positioned;
   d. spring drive means for biasing said socket means for rotation in a first direction, said drive means being tensioned by rotation of said socket means in a direction opposite to said first direction;
   e. indexing means for controlling rotation of said socket means in said first direction when said spring drive means is tensioned, said indexing means permitting incremental rotation of said socket means in said first direction to sequentially advance said flash lamps to an operative position for ignition in timed relationship to successive photographic exposures;

f. stop means for limiting rotary movement of said socket means in said first direction after a number of said incremental rotary movements and a final rotary movement, said number of incremental rotary movements being determined by the amount of angular rotation in said direction opposite said first direction imparted to said socket means; and g. second switch means responsive to said final rotary movement for converting said circuit means from operation according to said photoflash mode to operation according to said ambient mode.

9. Photographic exposure control apparatus comprising:

means for mounting and retaining a plurality of flashlamps;

sequencing means for sequentially and selectively coupling said flashlamps, from first to last, in circuit completing relationship with a source of electrical energy for causing the sequential ignition thereof to illuminate a scene; and an electrical exposure control circuit means operable according to a photoflash mode and an ambient mode, said circuit means being operable according to said photoflash mode when said plurality of flashlamps are mounted in said mounting means and one of said flashlamps is available for ignition from said source, said circuit means being automatically operable according to said ambient mode when the last of said flashlamps is unavailable for circuit completing relationship with said source of electrical energy.